(12) United States Patent
Berthet et al.

(10) Patent No.: US 8,180,497 B2
(45) Date of Patent: May 15, 2012

(54) SELECTIVE HARVESTING OF A LAND PARCEL BY A FRUIT HARVESTING MACHINE

(75) Inventors: Jean-Paul Berthet, La Chaize Giraud (FR); Thierry Le Briquer, Coëx (FR)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/998,318

(22) PCT Filed: Oct. 6, 2009

(86) PCT No.: PCT/EP2009/062992
§ 371 (c)(1),
(2), (4) Date: Apr. 6, 2011

(87) PCT Pub. No.: WO2010/040760
PCT Pub. Date: Apr. 15, 2010

(65) Prior Publication Data
US 2011/0203247 A1 Aug. 25, 2011

(30) Foreign Application Priority Data
Oct. 6, 2008 (FR) ...................................... 08 05511

(51) Int. Cl.
*G05D 11/00* (2006.01)
(52) U.S. Cl. ............................. 700/283; 701/50; 53/473
(58) Field of Classification Search .................. 700/283, 700/9, 240, 244, 284; 53/473, 475, 493; 702/5, 2, 3; 701/50; 73/861.73, 861.74, 73/861.75, 861.72; 56/328.1; 111/200
See application file for complete search history.

(56) References Cited

U.S. PATENT DOCUMENTS

| | | | | |
|---|---|---|---|---|
| 3,770,111 A * | 11/1973 | Greenwood et al. | ........... | 209/580 |
| 3,930,995 A * | 1/1976 | Paddock et al. | ............... | 209/698 |
| 4,105,123 A * | 8/1978 | Irving et al. | .................. | 209/566 |
| 4,118,311 A * | 10/1978 | Friedel et al. | .................. | 209/557 |
| 4,194,343 A * | 3/1980 | Myers et al. | .................... | 53/493 |
| 4,199,913 A * | 4/1980 | Hood et al. | ...................... | 53/244 |
| 4,279,346 A * | 7/1981 | McClure et al. | .............. | 209/582 |
| 4,363,408 A * | 12/1982 | O'Brien et al. | ............... | 209/546 |
| 4,901,861 A * | 2/1990 | Cicchelli | ........................ | 209/539 |
| 5,518,454 A * | 5/1996 | Twilley et al. | .................... | 460/7 |
| 5,808,305 A * | 9/1998 | Leidecker et al. | .......... | 250/341.8 |
| 5,957,773 A * | 9/1999 | Olmsted et al. | .................... | 460/7 |
| 5,991,025 A * | 11/1999 | Wright et al. | ................... | 356/328 |
| 6,236,907 B1 * | 5/2001 | Hauwiller et al. | ............ | 700/283 |
| RE37,574 E * | 3/2002 | Rawlins | ............................ | 702/2 |
| 6,419,093 B2 * | 7/2002 | Boese | ........................... | 209/670 |
| 6,483,583 B1 * | 11/2002 | Wright et al. | .................. | 356/326 |
| 2005/0090961 A1 * | 4/2005 | Bonk et al. | ....................... | 701/50 |

* cited by examiner

*Primary Examiner* — Arpad Fabian-Kovacs
(74) *Attorney, Agent, or Firm* — Michael G. Harms

(57) ABSTRACT

Selective harvesting of a parcel of land by a harvesting machine including a motorised support structure on which are mounted a harvesting assembly adapted to deliver a harvested stream, at least two receptacles (1) for storage of the stream and a system for respectively feeding a receptacle (1) with the stream as a function of the location of the machine in the parcel. The parcel is divided into distinct geographical areas and each receptacle is dedicated to an area. The machine comprises upper conveyor means (3) for feeding the receptacles (1) along respective feed paths, a lower conveyor (6) and a device for guiding the harvested stream by opening and closing the feed paths and varying the conveying direction of the lower conveyor, as a function of the receptacle to be fed with the harvested stream.

10 Claims, 1 Drawing Sheet

SELECTIVE HARVESTING OF A LAND PARCEL BY A FRUIT HARVESTING MACHINE

BACKGROUND OF THE INVENTION

The invention relates to a machine and method for selective harvesting of a parcel of land.

The invention applies in particular to the domain of mechanised harvesting of fruit growing on trees or bushes, such as grapes, berries or olives.

Fruit is conventionally harvested by a shaker assembly that straddles a row of plants to detach the harvest. The harvested stream obtained is then conveyed into the machine to feed it into at least one storage hopper.

However, in contrast to manual harvesting, mechanised harvesting offered no satisfactory solution for selecting the harvested fruit as a function of a harvesting criterion. In particular, manual harvesting of grapes enables the harvested grapes to be separated as a function of their quality and/or the yield so as to optimise subsequent vinification.

The invention aims to propose a machine and method for mechanised selective harvesting enabling automatic separation of the harvest as a function of at least one harvesting criterion.

BRIEF SUMMARY OF THE INVENTION

To this end, according to a first aspect, the invention proposes a harvesting machine comprising a motorised support structure on which are mounted:
- a harvesting assembly adapted to deliver a stream of harvested produce;
- at least two receptacles for storage of said stream; and
- a system for feeding a respective receptacle with said stream;

the harvesting machine further comprising:
- a device for determining the location of the harvesting machine in the parcel of land the machine is harvesting, the parcel being divided into geographical areas;
- a device for determining the area corresponding to said location; and
- a device that is adapted, as a function of the determined area, to automatically control the feeding system to store the harvested stream coming from said area in the receptacle that is dedicated to it, characterised in that the feeding system comprises:
upper conveyor means for feeding the receptacles on respective feed paths with a harvested stream coming from the harvesting assembly;
a lower conveyor for feeding a respective receptacle as a function of the conveying direction; and
a device for guiding the harvested stream that, for each feed path, is variable between an open state wherein said stream passes along said feed path, and a closed state wherein said stream is diverted onto the lower conveyor, the control device being operable to impose the open or closed state of the device for guiding the stream and the conveying direction of the lower conveyor as a function of the receptacle to be fed with the stream.

According to a second aspect, the invention proposes a method of selective fruit harvesting of a parcel of land by means of a harvesting machine according to the first aspect of the invention, said method comprising:
dividing the parcel of land into geographical areas as a function of at least one harvesting criterion of said area;
dedicating each of the receptacles (1) to storage of the harvest coming from at least one distinct area;
said method including the iterative harvesting steps of:
determining the location of the harvesting machine in the parcel of land;
determining the area corresponding to said location;
as a function of said area, automatically controlling the feeding system to store the harvested stream coming from said area in the receptacle (1) that is dedicated to it.

BRIEF DESCRIPTION OF THE DRAWINGS

Other objects and advantages of the invention will become apparent in the following description, given with reference to the accompanying drawings, in which.

DETAILED DESCRIPTION OF THE INVENTION

Figure 1:
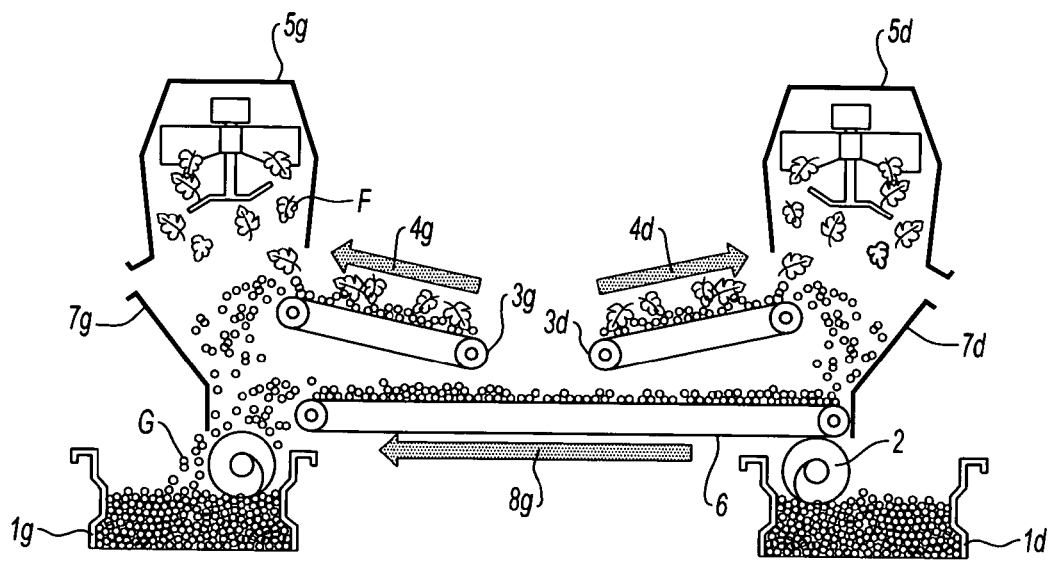
FIG. 1 is diagrammatically showing an embodiment of a feeding system for a harvesting machine of the invention, said system being actuated to feed a left-hand storage hopper.

The invention concerns a method for selectively harvesting a parcel of land by means of a harvesting machine. The description is given with reference to a grape harvesting machine for the mechanised harvesting of grapes, in particular with a view to subsequent vinification. However, the invention can be applied to the harvesting of other types of agricultural produce, in particular other fruits, using an appropriate harvesting machine.

A grape harvesting machine conventionally includes a motorised support structure that is equipped with a driver station and a harvesting assembly mounted on said structure.

The grape harvesting machine is adapted to straddle at least one row of vines so that, as it travels, the individual vine stocks are introduced successively into the harvesting assembly, which is adapted to detach the harvest so as to supply a harvested fruit stream. To this end, the harvesting assembly includes vine shakers, in particular a row of shakers on each side of the space into which the vine stocks are introduced.

The grape harvesting machine also includes a system for continuously recovering the detached harvest, which contains, in addition to the detached grape berries G, juice, leaves F, wood particles and bunches of various sizes. In one embodiment, the system includes two bucket conveyors adapted to recover the detached harvest below the introduction space and to convey said harvest into the upper portion of the harvesting machine.

On the support structure are also mounted at least two receptacles 1 for storing the harvested stream and a system for feeding a respective receptacle 1 with said stream.

Referring to the figures, the grape harvesting machine includes two hoppers $1d$, $1g$ for storing the harvest, respectively on the right-hand side and the left-hand side, said hoppers being equipped with an auger 2 for distributing the harvest stored over said hopper. The feeding system includes two upper conveyors $3d$, $3g$ for feeding a hopper $1d$, $1g$ along a respective feed path with the stream coming from the harvesting assembly.

More precisely, each bucket conveyor tips a harvested stream onto the belt of an upper conveyor $3g$, $3d$, said belt being moved toward the corresponding hopper $1g$, $1d$ along an upward path $4g$, $4d$. Furthermore, a suction system $5g$, $5d$ is provided above each feed path to eliminate from the harvested stream the constituents other than grape berries G, in particular leaves F and wood particles.

The selective harvesting method divides the parcel of land to be harvested into geographical areas as a function of at least one harvesting criterion of said area, in particular a qualitative and/or quantitative criterion. The harvesting criterion can in particular be a function of the value of at least one harvest parameter such as the yield, the maturity of the fruit (sugar content and/or pH). In particular, the harvesting criterion can be a function of a parameter, a number of parameters or a combination of parameters.

For example, the parcel of land can be divided into two geographical areas, a first area in which the harvest parameter is below a quantitative and/or qualitative threshold and a second area in which said parameter is above said threshold.

In one embodiment, the parcel of land to be harvested can be divided into areas before the start of the harvest. To this end, data relating to the harvest to be performed can be collected, for example by analysing aerial or satellite photographs of the parcel of land and/or by sampling measurements of the parameters in the parcel of land.

These data can then be processed by computer to generate a map in which the geographical coordinates of the areas of the parcel of land are partitioned as a function of the chosen harvesting criterion. This digital map can be stored on a computer in the form of a database linking each geographical coordinate to the area to which it belongs.

In particular, the map can be generated at the request of the harvester operator and in a manner that can be modified, in particular by selecting the relevant criterion or criteria, possibly a combination of criteria, the number of distinct harvesting areas in the parcel of land, and the precision of the geographical grid of said parcel of land.

The selective harvesting method aims at separating the harvest as a function of at least one harvesting criterion. To this end, it dedicates each of the receptacles 1 to storing harvest coming from at least one distinct area.

In particular, the parcel of land can be divided into a number of areas that is equal to the number of receptacles 1, the harvest from each area being stored in a respective receptacle 1. In the example where the parcel of land is mapped in two areas as a function of the threshold of a parameter, the harvest for which the parameter is above the threshold is stored in one hopper 1g/1d and the harvest for which the parameter is below said threshold is stored in the other hopper 1d/1g. Upon emptying each hopper 1g, 1d, it is therefore possible to handle the two types of harvest separately, in particular for subsequent vinification in the case of harvesting grapes.

The iterative harvesting steps described hereinabove are carried out at a frequency that can be adapted, on the one hand, to the speed at which the machine travels in the parcel of land and, on the other hand, to the accuracy of the map produced.

The harvesting machine includes a device for determining the location of said machine in the parcel of land, in particular an absolute positioning device of the GPS (Global Positioning System) or of the DGPS (Differential Global Positioning System) type. Thus after establishing the location of the harvesting machine in the parcel of land, it is possible to determine the area corresponding to said location.

In particular, the iterative determination of the harvesting area can be achieved by comparing machine location data from the positioning device and the geographical coordinates of the mapped areas. To this end, the harvesting machine is equipped with software for determining the distinct harvesting area that corresponds to its location, said software being loaded beforehand with the database relating to the generated map.

The selective harvesting method then, as a function of the harvesting area determined, automatically actuates the feeding system to store the harvested stream from said area in the receptacle 1 that is dedicated to it. Furthermore, on determining a passage of the machine from one harvesting area to another, actuation of the feeding system can be delayed so as to wait for the harvest from the new area to reach said feeding system via the harvesting assembly.

In particular, the harvest is fed by the bucket conveyors running at a speed that is equal and opposite to the travelling speed of the harvesting machine in the vineyard, in order to avoid friction between the buckets and the vine stocks. Consequently, upon entering the new area the feeding of one or the other of the receptacles 1 must change after the machine has travelled a predetermined distance, which corresponds to the length of the bucket conveyors between the point at which the harvest is received below the shakers and the point at which it is tipped onto the feeding system.

Referring to the Figures, the feeding system includes a lower conveyor 6 for feeding a respective hopper 1g, 1d as a function of the conveyor direction and a device for guiding the stream which, for each feeding path, can be altered between an open state wherein the stream passes along said feed path, and a closed state wherein the stream is diverted onto the lower conveyor 6.

The harvesting machine also includes a device for controlling the feeding system that is adapted to alter the feeding system automatically as a function of the distinct harvesting area that has been determined, for storing the harvested fruit stream coming from said area in the receptacle 1 that is dedicated to it.

Thus in the embodiment shown, the control device is adapted to impose, as a function of the hopper 1g, 1d to be fed with the stream, the open or closed state of the device for guiding the stream and the direction of movement of the belt of the lower conveyor 6.

In particular, the conveying direction imposed for the lower conveyor 6, in particular by a hydraulic motor, corresponds to that for feeding the hopper 1g/1d for which the feed path is open. Furthermore, the device for guiding the stream is controlled so that the open—respectively closed—state of one feed path corresponds to the closed—respectively open—state of the other feed path.

To this end, in the embodiment shown, the device for guiding the stream includes the two end portions of the lower conveyor 6 and means for moving said lower conveyor between two positions in which each end portion respectively opens and closes a feed path. In particular, the conveyor 6 can be mounted on transverse rails, the means for moving it including a hydraulic ram.

Furthermore, the device for guiding the stream includes, for each feed path, at least one deflector 7g, 7d delimiting said feed path. To be more precise, in the Figures, a deflector 7g, 7d delimits externally each of the feed paths between the end of the upper conveyor 4g, 4d and the corresponding hopper 1g, 1d.

Figure 2:
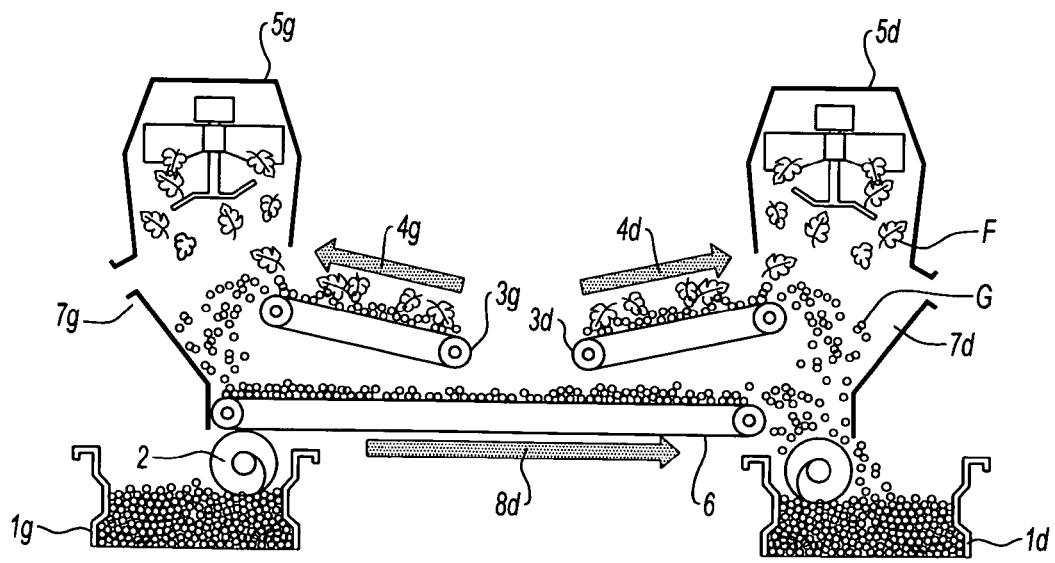
FIG. 2 is showing the feeding system of FIG. 1, being actuated to feed a right-hand storage hopper.

Accordingly, in the example where the parcel of land is mapped in two distinct areas, establishing that the machine is located in the first area will cause that the harvest coming from that area is stored in the left-hand hopper 1g by moving the lower conveyor 6 toward the right and imposing a direction of movement 8g upon the upper run of the lower conveyor 6 to the left-hand hopper 1g (FIG. 1). And, establishing that the machine is located in the second area will cause that the harvest coming from that area is stored in the right-hand hopper 1d by moving the lower conveyor 6 toward the left and imposing a direction of movement 8d of the upper conveyor run toward the right-hand hopper 1d (FIG. 2).

This control thus is completely automatic, in comparison with a manual intervention by the driver of the machine, particularly simple and fast to carry out, which enables particularly reliable and adaptable implementation of the selective harvesting method of the invention.

In a variant that is not shown, the deflectors 7d, 7g are movable between an open position in which the stream passes along the feed path and a closed position in which the stream is diverted onto the lower conveyor 6. This variant can be used with a lower conveyor 6 that has a fixed position relative to the hoppers 1d, 1g or with a movable conveyor 6 as described hereinabove.

In a further embodiment that is not shown, the harvesting machine includes a single hopper 1 for storing the harvest, said hopper being compartmented to form distinct storage receptacles dedicated to respective harvesting areas. A guide device including a movable conveyor and/or deflector can be used to feed such receptacles 1 selectively with the harvested stream.

In a particular embodiment, the hopper is provided with a compartmentation wall that is mobile to form two receptacles 1 of variable volume. Alternatively, the hopper can be compartmented into more than two receptacles 1, for instance three receptacles, so as to be able to divide the parcel of land into more than two distinct areas the harvest from which is stored separately.

Furthermore, the harvesting machine can comprise means for determining a filling state of the receptacles 1 and a device for moving the compartmentation wall to vary the volume of the receptacles 1 as a function of said state. For example, the determination means can include weighing means and/or a sensor of the level to which each receptacle 1 is filled, in particular an ultrasound level sensor.

Accordingly, it is possible to adapt the volume of the receptacles 1 during an additional iterative harvesting step as a function of the quantity actually harvested in each harvesting area. Alternatively, the volume of the receptacles 1 can be adapted before carrying out the iterative harvesting steps, in particular after emptying the receptacles 1. The map of the parcel of land shows the area or areas to be harvested, making it possible to estimate the quantity of harvest that must be stored in each of the receptacles 1 until they are next emptied.

This in particular optimises the amount of harvest stored in the machine, regardless of the distribution of the areas within the parcel of land. Thus a frequency for emptying the harvest stored in the machine can be retained that is identical to that of prior art non-selective mechanised harvesting. In particular, the compartmented hopper can have exactly the same capacity as the hoppers of prior art harvesting machines, so as to retain the same hopper emptying locations at the end of vine rows.

The selective harvesting method can further include an iterative harvesting step that determines at least one harvest parameter, in particular a harvest parameter used in the criterion for land parcel subdivision.

To this end, the harvesting machine can be equipped with sensors, for example sensors measuring a parameter of the harvested stream. In particular, it is possible to install weight sensors for measuring the harvested stream and deriving therefrom the yield rate, near infrared (NIR) sensors for measuring the sugar content, and pH sensors.

Furthermore, the parameter determined can be stored in relation to the location of the harvesting machine at the moment said parameter was determined or, more advantageously, to the location of the vines from which the measured fruit originated. Thus the parcel of land can be subdivided using, on its own or in addition to other data, at least one parameter stored during earlier harvesting, in particular the previous harvesting, of said parcel of land.

Moreover, in the context of the cultivation of the parcel of land, the parameters stored during the previous harvest can be used to adapt intervention to the requirements resulting from said parameters, in particular pruning or spreading a product such as fertiliser or a phyto-sanitary product.

Moreover, the iterative determination of the harvesting area in which the machine is located, can include comparing the parameter determined and the criterion corresponding to the areas. In particular, if according to the map of the parcel of land the machine is located in an area in which a harvesting parameter is above—or below—a threshold, it is possible to verify this criterion by measuring the parameter concerned in situ.

Thus it is possible to determine the harvesting area a priori on the basis of the map and to verify that determination on the basis of an in situ measurement. This embodiment therefore reinforces the conditions for the control of the feed system so as to make the separation of the harvest as a function of the area from which it comes, even more reliable.

The invention claimed is:

1. A harvesting machine comprising a motorised support structure on which are mounted a harvesting assembly adapted to deliver a stream of harvested produce at least two receptacles (1d, 1g) for storage of said stream, and a system for feeding a respective receptacle (1) with said stream, the harvesting machine further comprising:
a device for determining the location of the harvesting machine in the parcel of land the machine is harvesting, the parcel being divided into geographical areas;
a device for determining the area corresponding to said location; and
a device that is adapted, as a function of the determined area, to automatically control the feeding system to store the harvested stream coming from said area in the receptacle (1) that is dedicated to it,
wherein the feeding system comprises:
upper conveyor means (3g, 3d) for feeding the receptacles (1g, 1d) on respective feed paths with a harvested stream coming from the harvesting assembly;
a lower conveyor (6) for feeding a respective receptacle (1g, 1d) as a function of the conveying direction; and
a device for guiding the harvested stream that, for each feed path, is variable between an open state wherein said stream passes along said feed path, and a closed state wherein said stream is diverted onto the lower conveyor (6), the control device being operable to impose the open or closed state of the device for guiding the stream and the conveying direction of the lower conveyor (6) as a function of the receptacle (1g, 1d) to be fed with the stream.

2. A harvesting machine according to claim 1, wherein the receptacles comprise two hoppers (1g, 1d) for storing the harvest.

3. A harvesting machine according to claim 1, wherein the upper conveyor means comprise two upper conveyors (3g, 3d) for each feeding a receptacle (1g, 1d) on a respective feed path.

4. A harvesting machine according to claim 1, wherein the device for guiding the harvested stream is such that the open—respectively closed—state of one feed path corresponds to the closed—respectively open—state of the other feed path.

5. A harvesting machine according to claim 4, wherein the device for guiding the harvested stream comprises the two end portions of the lower conveyor (6) and means for moving said lower conveyor between two positions wherein each end portion respectively opens and closes a feed path.

6. A harvesting machine according to claim 1, wherein the device for guiding the harvested stream comprises, for each feed path, at least one deflector (7g, 7d) delimiting said feed path.

7. A harvesting machine according to claim 6, wherein deflectors (7g, 7d) are movable between an open position in which the stream passes along the feed path and a closed position in which the stream is diverted onto the lower conveyor (6).

8. A harvesting machine according to claim 1, wherein the harvesting machine further includes a hopper for storing the harvest, said hopper being compartmented to form the storage receptacles (1).

9. A harvesting machine according to claim 8, wherein the hopper is provided with a compartmentation wall that is mobile so as to form receptacles (1) of variable volume.

10. A harvesting machine according to claim 9, wherein the harvesting machine further includes means for determining a state of filling of the receptacles (1) and a device for moving the compartmentation wall to vary the volume of the receptacles (1) as a function of said state.

* * * * *